Figure 1:
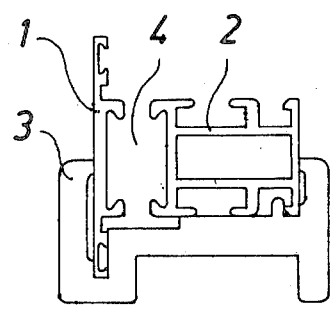

United States Patent [19]

Mühle

[11] 4,349,495

[45] Sep. 14, 1982

[54] METHOD OF PRODUCING THERMALLY INSULATED COMPOSITE SECTIONS, AND A COMPOSITE SECTION PRODUCED BY THIS METHOD

[76] Inventor: Manfred Mühle, Tulpenstrasse 11, D-4972 Löhne 2, Fed. Rep. of Germany

[21] Appl. No.: 168,407

[22] Filed: Jul. 14, 1980

[30] Foreign Application Priority Data

Jul. 14, 1979 [DE] Fed. Rep. of Germany ....... 2928574

[51] Int. Cl.³ .............................................. B29D 27/04
[52] U.S. Cl. ............................. 264/45.8; 49/DIG. 1; 52/309.8; 52/403; 264/45.1; 264/46.5; 264/46.7
[58] Field of Search ..................... 264/46.5, 46.7, 45.1, 264/45.5, 45.8, 46.2; 52/403, 731, 309.8, 309.9, 309.14; 49/DIG. 1

[56] References Cited

U.S. PATENT DOCUMENTS

| | | | |
|---|---|---|---|
| 3,020,587 | 2/1962 | Alderfer et al. ..................... | 264/45.1 |
| 3,156,332 | 11/1964 | Cameron .............................. | 52/403 |
| 3,393,487 | 7/1968 | Nolan .................................... | 52/403 |
| 3,634,565 | 1/1972 | Schaerer ........................ | 264/46.7 X |
| 3,657,036 | 4/1972 | Mullenhoff et al. ............ | 264/46.2 X |
| 3,786,121 | 1/1974 | Schaerer ........................ | 264/46.7 X |
| 3,865,914 | 2/1975 | Nahr .................................. | 264/46.5 |
| 3,895,087 | 7/1975 | Ottinger et al. ..................... | 264/46.2 |
| 4,069,631 | 1/1978 | Nahr ................................. | 52/403 X |
| 4,128,934 | 12/1978 | Doring ........................... | 264/46.5 X |
| 4,185,439 | 1/1980 | Bischlipp et al. .............. | 264/46.5 X |

FOREIGN PATENT DOCUMENTS

| | | |
|---|---|---|
| 1245567 | 12/1963 | Fed. Rep. of Germany . |
| 2129964 | 2/1972 | Fed. Rep. of Germany . |
| 2254762 | 5/1974 | Fed. Rep. of Germany . |
| 2412317 | 9/1974 | Fed. Rep. of Germany ........ 52/403 |
| 2705870 | 9/1977 | Fed. Rep. of Germany . |
| 2721367 | 7/1979 | Fed. Rep. of Germany . |
| 2908618 | 9/1980 | Fed. Rep. of Germany . |
| 54-141850 | 11/1979 | Japan ................................. 264/46.5 |

*Primary Examiner*—Philip Anderson
*Attorney, Agent, or Firm*—Max Fogiel

[57] ABSTRACT

In a method for the production of thermally insulated composite sections a free space (4) formed between at least two metal sections (1,2), held spaced apart, and sealed at the bottom is filled from its open side with an insulating material (10) which at first is in liquid form and then hardens. In order to produce such sections, particularly also those of large size, with the least possible expense for labor and material, and at the same time to achieve the most favorable heat insulation values in the insulating region, solid insulating material layers (12,13) positively and frictionally joining together the metal sections (1,2), and insulating layers (14) hardening with a porous structure are introduced in succession into the free space (4), each layer only partly filling the free space.

The introduction of the solid insulating material layers (12,13) and of the insulating layers (14) is expediently effected with the aid of a plurality of inlet nozzles (16, 17, 18) whose actions are chronologically staggered and which are disposed one behind the other in the working direction (19) of the filling operation, and for the porous insulating layers (14) the same material can be used as for the solid insulating material layers (12,13), a blowing agent which provides the porous insulating layers (14) with their porous structure being contained in the material in the case of the porous insulating layers (14).

5 Claims, 7 Drawing Figures

METHOD OF PRODUCING THERMALLY INSULATED COMPOSITE SECTIONS, AND A COMPOSITE SECTION PRODUCED BY THIS METHOD

The invention relates to a method of producing thermally insulated composite sections, wherein at least two metal sections held spaced apart form a free space which is sealed at the bottom and which from its open side is filled with an insulating material which is at first in liquid form and then hardens. Composite sections produced by this method are used mainly in the construction of doors and windows, a field in which they are of increasing importance for reasons of energy saving.

One method of the type defined above is described in German Patent Application P 29 08 618.8. Its starting point is that at the beginning of the process the metal sections are inserted into a holder which supports them in such a manner that they form the free space intended to receive the insulating material, whereupon the free space laterally bounded by the metal sections is closed, both from above and at the ends of the metal sections, by a self-adhesive cover strip adhering to the metal sections and a channel-shaped guide section is disposed over the metal sections. In a further stage of the process the channel-shaped guide section, together with the metal sections and their holder, is turned about 180° in the longitudinal axis and the holder, which thus comes to lie at the top, is removed from the metal sections. The insulating material, which is in liquid form, is then introduced into the free space through the side of the latter which remains uncovered, whereupon, after the insulating material has hardened, the finished composite section can be removed from the guide section.

From German Offenlegungsschrift No. 21 29 964 and German Offenlegungsschrift No. 27 05 870 other methods are known, in which the metal sections which are to be joined together by a layer of insulating material are disposed, spaced apart from one another, in a mould and sealed by a movable strip on the bottom side along the free space existing between them, or for the same purpose are pressed down against a bottom covering in the mould. The free space, which is thus open only at the top, can then be filled with liquid insulating material in order to form the composite section.

From German Auslegeschrift No. 12 45 567 it is also known for the metal sections, which are separated from one another in the composite section, to be produced as a one-piece section before the free space is filled with insulating material, being joined together below the free space by a bridging web which closes the free space and which after the layer of insulating material has hardened is cut away or mechanically removed by other means.

In order on the one hand to improve the thermal efficiency of the layer of insulating material of composite sections of the kind in question, and on the other hand to save expensive insulating material, particularly for large sections, it has already frequently been proposed to use the insulating material introduced into the free space formed by the metal sections only for forming individual connecting webs between the metal sections, leaving an air-filled cavity free from insulating material. Methods of this kind are explained in German Offenlegungsschrift No. 22 54 762 and German Offenlegungsschrift No. 27 21 367, in which the free space is divided into a plurality of chambers by spaced hollow dividing pieces or separating strips.

Because of the introduction of these dividing means, and also because of their subsequent removal, these known methods of production are very time-consuming and therefore very expensive. It is also not possible to reduce costs by leaving the dividing means as lost pieces in the composite section, because their cost, which although low is nevertheless not negligible, still increases production costs. Moreover, dividing pieces or separating strips which remain in the composite section form temperature bridges between the metal sections thermally insulated from one another, whereby the action of the layers of insulating material is impaired.

A disadvantage of airfilled cavities arises from the fact that these cavities must be provided with drain holes, which at the same time are indispensable for vapour pressure equalisation. Consequently, there is a continuous exchange of air, which not only basically reduces the insulating action of the cavity, but at low temperatures also gives rise to the formation of ice, which completely destroys the insulating action. It is therefore more advisable to fill the cavities between the insulating layers with a material of lower thermal conductivity, because in this way a controlled insulating action can be achieved. Moreover, the acoustically disturbing resonance effect of cavities is thereby avoided.

The filling of the cavities in the insulation region of composite sections is already mentioned in German Offenlegungsschrift No. 27 21 367. Among various examples of embodiment mention was made therein of the possibility of inserting into the cavity, as support for forming the upper insulation layer, a separating strip of expanded rubber or other similar material, and leaving it in the cavity. It is true that the air gap in the composite section would thus be eliminated, but the introduction of a separating strip of this kind requires another very expensive operation, which in addition assuredly gives rise to production difficulties. This last point may also be the reason that the practical application of this stage of the process is not yet known to have occurred.

Taking as starting point the state of the art explained above, the problem underlying the invention is that of indicating a method of production by which thermally insulated composition sections, even of large sizes, can be produced in the simplest and most inexpensive manner, while these composite sections should have a completely closed insulating region with particularly advantageous heat insulation values. For the introduction of the multilayer insulating core it is endeavoured in the most expedient conduct of the process to employ a single operation, in order to reduce considerably the cost of production. This should in addition be achieved with very economical consumption of insulating material, this economy being based on the fact that expensive material of great strength is not used for the entire insulating zone, but that the use of such material is restricted to supporting portions thereof, while with regard to the remainder of the filling material it is endeavoured to achieve the lowest possible thermal conductivity.

The method characterised in the claims is proposed as a solution to the problem posed. With low expenditure of time and at low cost it is now possible thereby to produce composite sections which between their individual sections, which are not metallically connected, have an insulating zone possessing the most advantageous properties. These consist in that the insulating zone is composed both of layers of insulating material of great strength for the positive and frictional connection of the metal sections, and of insulating layers which have a still better insulating action but do not serve as supports, and whose construction and thickness can be adapted to any shape of section without needing additional process steps or operations. Consequently, the selection of materials is simplified, with the result that it is always possible to use inexpensive materials, for which, within the composite sections of the invention, it is even possible to use the same starting material, the structure of which is then suitably varied solely by adding expanding agents.

Figure 2:
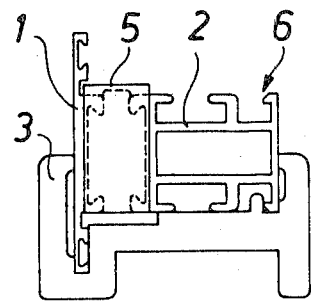
Figure 3:
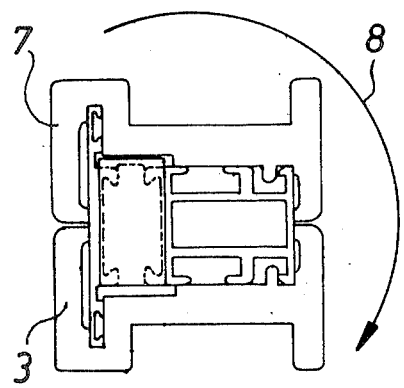
Figure 4:
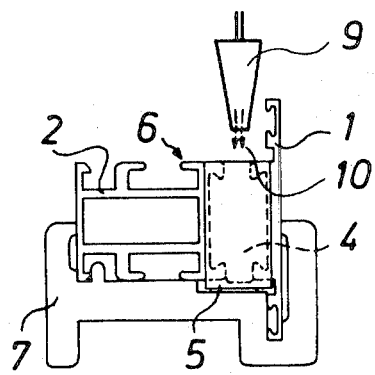
Figure 5:
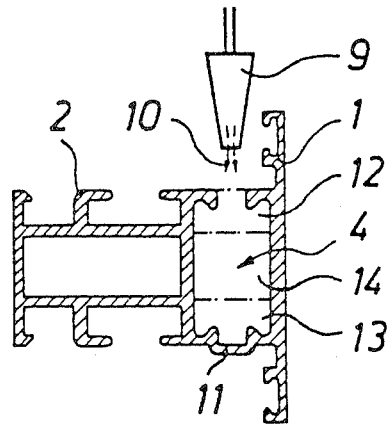
Figure 6:
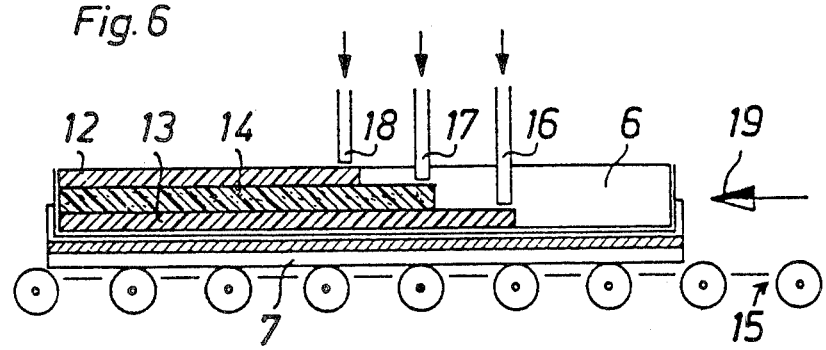
Figure 7:
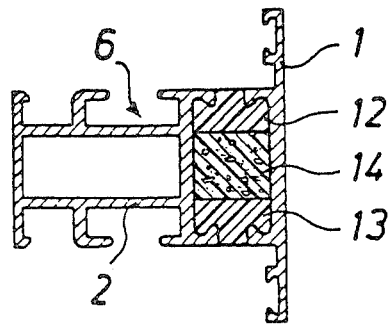

Embodiments of the invention are described below as examples with reference to the drawings, in which:

FIGS. 1 to 4 show the stages of the process in the production of a thermally insulated composite section, in end elevation, FIG. 5 is a cross-section of another composite section in course of production, FIG. 6 illustrates the method of production by means of a longitudinal section of the composite section shown in FIG. 4, and FIG. 7 is a cross-section of a composite section produced by the method of the invention.

As can be seen in FIG. 1, at the beginning of the process two metal sections 1 and 2 shown in end elevation are inserted, spaced apart, into a holder 3, which is likewise shown viewed from the end face, so that the holder 3 supports the metal sections 1 and 2 and forms a free space 4 situated between them. As shown in FIG. 2, the free space 4 is closed at the top and also at the ends of the metal sections 1 and 2 by a self-adhesive cover strip 5.

A channel-shaped guide section 7, which is shown in FIG. 3 and which has the same cross-section as the holder 3, is then placed over the metal sections 1 and 2, which have already been loosely joined together to form a composite section 6, and, likewise as shown in FIG. 3, this guide section together with the metal sections 1 and 2 and the holder 3 is turned 180° in the direction of the arrow 8. As shown in FIG. 4, the guide section 7 then comes to lie at the bottom, whereupon the holder 3, now lying at the top, has completed its mission and therefore can be removed from the metal sections 1 and 2. In the state shown in FIG. 4 the free space 4 is sealed at the bottom, and from its open longitudinal side can be filled by means of an inlet nozzle 9 with an insulating material 10 which at first is in liquid form and then hardens.

According to the embodiment illustated in FIG. 5 the free space 4, which is provided between the metal sections 1 and 2 and which is closed at the bottom, may also be formed by producing the metal sections 1 and 2 as a one-piece section before being filled with the insulating material 10, being joined together under the free space 4 by a bridging web 11. In both embodiments the free space 4 is then filled with the insulating material supplied by the nozzle 9 in that solid insulating material layers 12,13 positively and frictionally joining together the metal sections 1 and 2 and one or more insulating layers 14 hardening with a porous structure are introduced in alternating succession, each layer only partly filling the free space 4. For the porous insulating layer 14 it is possible to use the same material as for the solid insulating material layers 12 and 13, if for the porous insulating layers 14 a blowing agent providing them with a porous structure, for example in the form of closed-cell polyurethane foam, is added.

A further improvement of the production method of the invention is achieved in accordance with FIG. 6 by depositing the composite section 6, which has been obtained as the result of the process steps illustrated in FIGS. 1 to 4, together with the guide section 7, on a roller conveyor 15 and moving it under stationary inlet nozzles 16, 17, and 18. These inlet nozzles 16, 17, and 18 are disposed one following the other in the working direction 19 of the filling operation, and thus are chronologically staggered in the introduction of the two layers of insulating material 12 and 13 and the interposed insulating layer 14. As the result of this arrangement it is possible to produce all the layers 12, 13, and 14 in a single operation. With a suitably modified apparatus it would of course also be possible to produce the bottom insulating material layer 13 during the movement of the composite section 6 in the working direction, the following insulating layer 14 during the return movement of the composite section 6, and the upper layer of insulating material 12 likewise in the working direction 19.

FIG. 7 shows the structure of the composite section 6 produced by the process stages described above. From this Figure it can be seen that the metal sections 1 and 2 are now joined together only by the two solid insulating material layers 12 and 13 after the self-adhesive cover strip 5 shown in FIG. 4 and the bridging web 11 shown in FIG. 5 have been removed from the metal sections 1 and 2. The purpose of the insulating layer 14, which on hardening is of porous structure, is to serve as a support for the formation of the upper layer of insulating material 12 during the introduction of the latter and also to ensure that no cavity arises between the insulating material layers 12 and 13, while it is not intended to play any part in the joining together of the metal sections 1 and 2. In contrast to the composite section 6 illustrated, it is possible, in particular for sections of larger sizes, to introduce more than two layers 12,13 of insulating material, and consequently also a plurality of interposed insulating layers 14.

I claim:

1. A method of producing thermally insulated composite sections, comprising the steps of: holding at least two metal sections spaced apart to form a free space which is sealed at the bottom and which has an open side; filling said free space from its open side with first insulating material layers which are at first in liquid form and then harden to form a porous structure; introducing second solid insulating material layers for positively and frictionally joining together the metal sections and first insulating layers in alternating succession into said free space formed between the metal sections, each layer only partly filling said free space; the step of introducing the second solid insulating material layers and the first insulating layers being carried out with a plurality of inlet nozzles whose actions are chronologically staggered, said inlet nozzles being disposed one behind the other in operating direction of the filling operation; and using for the first insulating layers the same material as for the second solid insulating material layers, a blowing agent which provides the first insulating layers with their porous structure being contained in the material for the first insulating layers; closing the free space at the top and also at the ends of the metal sections by a self-adhesive cover strip; placing a channel-shaped guide section over the metal sections to form a composite section; turning the guide section together with the metal sections through an angle of substantially 180°, so that the guide section lies at the bottom; and sealing said free space at the bottom.

2. A method as defined in claim 1, wherein said metal sections are formed as a one-piece section before being filled with insulating material, said sections being placed on a conveyor and moved under said inlet nozzles, said nozzles being stationary, said metal sections being finally joined together by two second solid insulating material layers, a first insulating layer which is porous on hardening, serving as a support for the formation of the upper layer of insulating material during introduction of the latter and preventing cavities between the insulating material layers, said insulating layer being free of participation in joining together said metal sections.

3. A method as defined in claim 1 wherein said metal sections are formed as a one-piece section before being filled with insulating material.

4. A method as defined in claim 1 wherein the composite sections are placed on a conveyor and moved under said inlet nozzles, said nozzles being stationary.

5. A method as defined in claim 1 wherein said metal sections are finally joined together by two second solid insulating material layers, a first insulating layer which is porous on hardening, serving as a support for the formation of the upper layer of insulating material during introduction of the latter and preventing cavities between the insulating material layers, said insulating layer being free of participation in joining together said metal sections.

* * * * *